United States Patent
Woo et al.

(10) Patent No.: US 10,295,858 B2
(45) Date of Patent: May 21, 2019

(54) CURVED DISPLAY DEVICE

(71) Applicant: Samsung Display Co., Ltd., Yongin-si, Gyeonggi-Do (KR)

(72) Inventors: SuWan Woo, Osan-si (KR); Wan-Soon Im, Cheonan-si (KR); Kee-Bum Park, Cheonan-si (KR); Younggoo Song, Asan-si (KR); Heehwan Lee, Seoul (KR); Yongwoo Hyung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/685,352

(22) Filed: Aug. 24, 2017

(65) Prior Publication Data

US 2017/0351133 A1    Dec. 7, 2017

Related U.S. Application Data

(63) Continuation of application No. 14/138,256, filed on Dec. 23, 2013, now Pat. No. 9,791,750.

(30) Foreign Application Priority Data

Jul. 29, 2013    (KR) .................... 10-2013-0089566

(51) Int. Cl.
*G02F 1/1335*    (2006.01)
*G02F 1/1333*    (2006.01)
(Continued)

(52) U.S. Cl.
CPC .... *G02F 1/133512* (2013.01); *G02F 1/13439* (2013.01); *G02F 1/133305* (2013.01);
(Continued)

(58) Field of Classification Search
CPC ........... G02F 1/13439; G02F 1/136209; G02F 1/133514; G02F 1/133512; G02F 1/13473;
(Continued)

(56) References Cited

U.S. PATENT DOCUMENTS 5,708,485 A    1/1998    Sato et al.
5,777,701 A    7/1998    Zhang
(Continued)

FOREIGN PATENT DOCUMENTS

CN    1837936 A    9/2006
CN    101097372 A    1/2008
(Continued)

OTHER PUBLICATIONS

Partial European Search Report for Application No. 16152563.9-1904 dated May 3, 2016.

*Primary Examiner* — Shan Liu
(74) *Attorney, Agent, or Firm* — Cantor Colburn LLP

(57) ABSTRACT

A curved display device curved in a first direction includes: a first substrate including a plurality of signal lines, an insulating layer which covers the signal lines, a pixel electrode disposed on the insulating layer, and a shielding electrode electrically insulated from the pixel electrode and disposed along a signal line, which extends substantially in a second direction crossing the first direction, among the signal lines; a second substrate disposed opposite to the first substrate and including a common electrode; and a light control layer interposed between the first substrate and the second substrate.

7 Claims, 13 Drawing Sheets

(51) Int. Cl.
  *G02F 1/1362* (2006.01)
  *G02F 1/1337* (2006.01)
  *G02F 1/1343* (2006.01)
(52) U.S. Cl.
  CPC .. *G02F 1/133707* (2013.01); *G02F 1/136209* (2013.01); *G02F 1/136286* (2013.01); *G02F 2001/133757* (2013.01); *G02F 2001/136218* (2013.01)
(58) Field of Classification Search
  CPC ... G02F 1/133371; G02F 2001/136222; G02F 2001/136218; G02F 1/133305; G02F 1/136286; G02F 1/133707; G02F 2001/133757; G02F 2201/56; H01J 11/44; H01J 2211/444; H01J 2329/323; H01J 29/327; H01L 21/02367; H01L 27/12; H01L 27/1203; H01L 27/1218
  USPC .......................... 349/106–111, 158
  See application file for complete search history.

(56) References Cited

U.S. PATENT DOCUMENTS

| | | | |
|---|---|---|---|
| 6,249,011 | B1 | 6/2001 | Matsumoto |
| 7,834,962 | B2* | 11/2010 | Satake .............. G02F 1/133305 349/110 |
| 7,973,754 | B2 | 7/2011 | Kim |
| 8,077,269 | B2 | 12/2011 | Kim et al. |
| 8,144,280 | B2 | 3/2012 | Lee et al. |
| 8,384,867 | B2 | 2/2013 | Ishii et al. |
| 9,791,750 | B2* | 10/2017 | Woo .................. G02F 1/13439 |
| 2002/0051101 | A1 | 5/2002 | Kurahashi et al. |
| 2003/0002001 | A1 | 1/2003 | Ota et al. |
| 2003/0234971 | A1* | 12/2003 | Murade ............. G02F 1/136209 359/315 |
| 2004/0135939 | A1 | 7/2004 | Luo |
| 2005/0110924 | A1* | 5/2005 | Kim .................. G02F 1/133707 349/111 |
| 2005/0237459 | A1 | 10/2005 | Ikeda et al. |
| 2006/0164352 | A1 | 7/2006 | Yoo et al. |
| 2006/0215071 | A1* | 9/2006 | Shin ...................... G02F 1/1362 349/44 |
| 2007/0153169 | A1* | 7/2007 | Zhang ............... G02F 1/136213 349/110 |
| 2007/0170504 | A1 | 7/2007 | Chang |
| 2008/0136992 | A1* | 6/2008 | Kim .................. G02F 1/133514 349/48 |
| 2009/0161048 | A1* | 6/2009 | Satake .............. G02F 1/133305 349/110 |
| 2009/0179840 | A1 | 7/2009 | Tanaka et al. |
| 2009/0186551 | A1 | 7/2009 | Kim et al. |
| 2009/0207366 | A1 | 8/2009 | Kim |
| 2010/0123845 | A1 | 5/2010 | Kim et al. |
| 2010/0157185 | A1* | 6/2010 | Kim ...................... G02F 1/1362 349/38 |
| 2010/0245733 | A1* | 9/2010 | Ono .................. G02F 1/13394 349/106 |
| 2012/0033170 | A1 | 2/2012 | Kim et al. |
| 2014/0167160 | A1 | 6/2014 | Chen et al. |
| 2014/0327846 | A1* | 11/2014 | Hata ...................... G06F 3/041 349/12 |
| 2015/0015819 | A1 | 1/2015 | Nishide et al. |

FOREIGN PATENT DOCUMENTS

| | | |
|---|---|---|
| CN | 102854674 A | 1/2013 |
| KR | 20010001757 A | 1/2001 |
| KR | 1020010001757 A | 1/2001 |
| KR | 1020070016567 A | 2/2007 |
| KR | 1020130030649 A | 3/2013 |
| KR | 1020130034744 A | 4/2013 |
| WO | 2013029262 A1 | 3/2013 |
| WO | 2014036730 A1 | 3/2014 |

\* cited by examiner

CURVED DISPLAY DEVICE

This application is a continuation of U.S. patent application Ser. No. 14/138,256, filed on Dec. 23, 2013, which claims priority to Korean Patent Application No. 10-2013-0089566, filed on Jul. 29, 2013, and all the benefits accruing therefrom under 35 U.S.C. § 119, the content of which in its entirety is herein incorporated by reference.

BACKGROUND

1. Field

The disclosure relates to a display device. More particularly, the disclosure relates to a display device having a curved display panel.

2. Description of the Related Art

A liquid crystal display includes two substrates and a liquid crystal layer disposed between the two substrates. The liquid crystal display drives liquid crystal molecules of the liquid crystal layer to control a light transmittance in pixels, thereby displaying an image.

In a vertical alignment mode liquid crystal display among various operation modes of the liquid crystal display, the liquid crystal molecules of the liquid crystal layer are vertically aligned with respect to the substrates when an electric field is generated between the two substrates, and the vertically aligned liquid crystal molecules transmits the light, to thereby display the image. The vertical alignment mode liquid crystal display includes liquid crystal domains to align the liquid crystal molecules in different directions, and thus a viewing angle of the liquid crystal display is improved.

In recent years, a curved display device has been developed. The curved display device provides a user with a curved display area, and thus the curved display device provides the image having improved three-dimensional effect, immersiveness and presence to the user.

SUMMARY

The disclosure provides a curved display device including a curved display panel with improved display quality.

Exemplary embodiments of the invention provide a curved display device curved in a first direction. In such embodiments, the curved display device includes a first substrate, a second substrate disposed opposite to the first substrate and including a common electrode, and a light control layer interposed between the first substrate and the second substrate.

In such embodiments, the first substrate includes a plurality of signal lines, an insulating layer which covers the signal lines, a pixel electrode disposed on the insulating layer, and a shielding electrode electrically insulated from the pixel electrode and disposed along a signal line, which extends substantially in a second direction crossing the first direction, among the signal lines.

According to such exemplary embodiment, the shielding electrode receives the voltage having substantially the same electric potential as the voltage applied to the common electrode, and thus no electric field is generated between the shielding electrode and the common electrode. Therefore, the shielding electrode blocks the light provided from the backlight assembly through the liquid crystal layer, and the black matrix may be omitted from the second substrate corresponding to the shielding electrode.

Thus, the black matrix on the second substrate may be effectively prevented from being perceived as the vertical dark portion of a line shape in a pixel area, which is caused by misalignment between the first and second substrates.

In such embodiments, by adjusting the width of the shielding electrode, texture defects may be effectively prevented from being perceived due to the misalignment of the liquid crystal molecules in a boundary between adjacent pixel electrodes to each other.

BRIEF DESCRIPTION OF THE DRAWINGS

The above and other feature of the disclosure will become more apparent by describing in further detail exemplary embodiments thereof with reference to the accompanying drawings, in which.

DETAILED DESCRIPTION

Figure 1A:
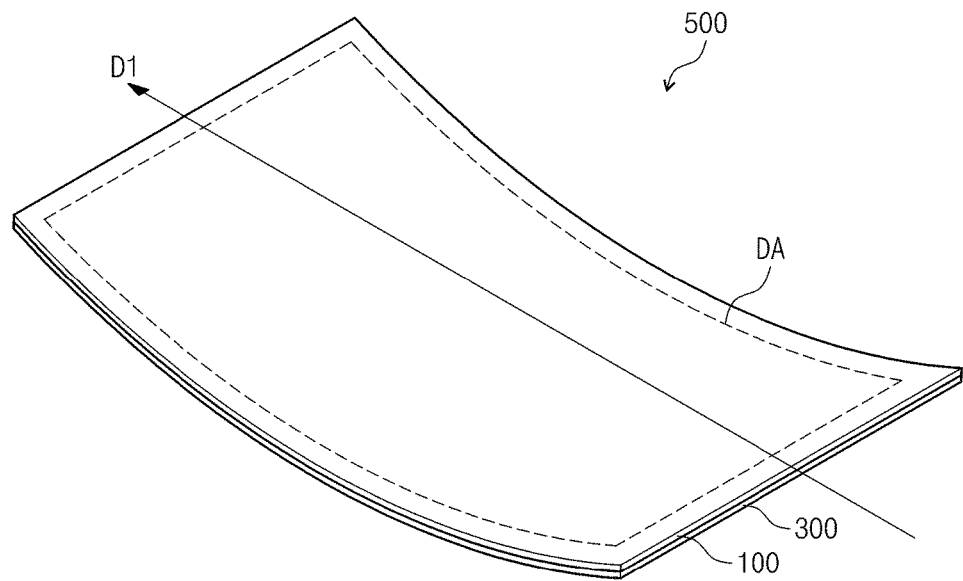
FIG. 1A is a perspective view of an exemplary embodiment of a curved display device, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims Hereinafter, exemplary embodiments of the invention will be described in detail with reference to the accompanying drawings.

Figure 1B:
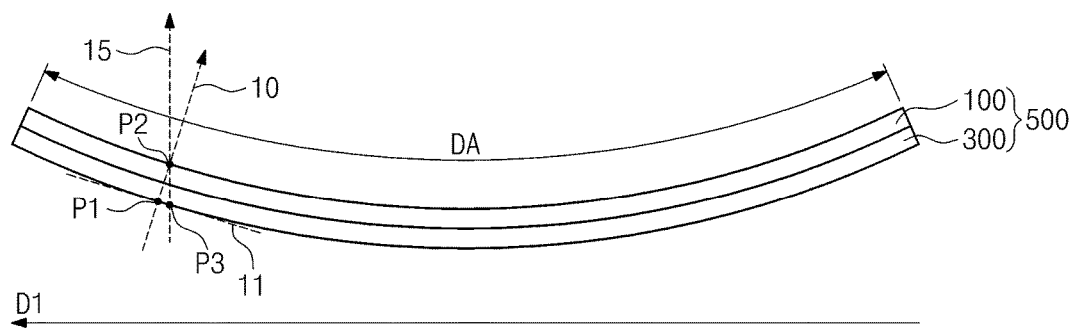
FIG. 1B is a side view of the curved display device shown in FIG. 1A.

FIG. 1A is a perspective view of an exemplary embodiment of a curved display device, according to the invention, and FIG. 1B is a side view of the curved display device shown in FIG. 1A.

Referring to FIG. 1A, an exemplary embodiment, a display device 500 has a shape curved in a first direction D1. In such an embodiment, the display device 500 may be curved in a direction in which a user watches the display device 500, and thus the user perceives an image displayed on a curved screen, e.g., a cured display area DA therein. The display device 500 having the curved display area DA is referred to as a curved display device 500. When the image is displayed using the curved display device 500, three-dimensional effect, immersiveness and presence of the image provided to the user may be substantially improved.

In an exemplary embodiment, the curved display device 500 includes a first substrate 100, a second substrate 300 facing the first substrate 100, and a light control layer (not shown) interposed between the first substrate 100 and the second substrate 300. In one exemplary embodiment, for example, the light control layer may be, but not limited to, a liquid crystal layer.

The first and second substrates 100 and 300 have a shape curved along the first direction D1. A portion or an entire of the first substrate 100 may be continuously curved along the first direction D1, and thus the display area DA is curved along the first direction D1 to have a curved surface shape. In such an embodiment, the second substrate 300 may be curved corresponding to the first substrate 100.

Referring to FIG. 1B, in an exemplary embodiment, where the first and second substrates 100 and 300 have the curved shape, a normal line 10 vertical to a tangent line 11 in contact with a first position P1 on a surface (e.g., an outer surface) of the second substrate 300 passes through a second position P2 on a surface (e.g., an outer surface) of the first substrate 100. However, a gaze line 15, which passes through the second position P2 in a gaze direction, in which the user watches the curved display device 500, passes through a third position P3 on the second substrate 300, which is different from the first position P1 on the second substrate 300.

A distance between the first position P1 and the third position P3 is varied depending on a curvature of the curved display device 500. In such an embodiment, as the curvature of the curved display device 500 increases, the distance between the first position P1 and the third position P3 increases.

As described above, a phenomenon in which the distance occurs between the first position P1 and the third position P3 is referred to as a misalignment between the first and second substrates 100 and 300 due to the curvature. Herein, the distance between the first position P1 and the third position P3 is defined as a misalignment value. Hereinafter, an exemplary embodiment of a curved display device, in which a texture defect is effectively prevented from being perceived due to the misalignment, will be described in detail.

Figure 2:
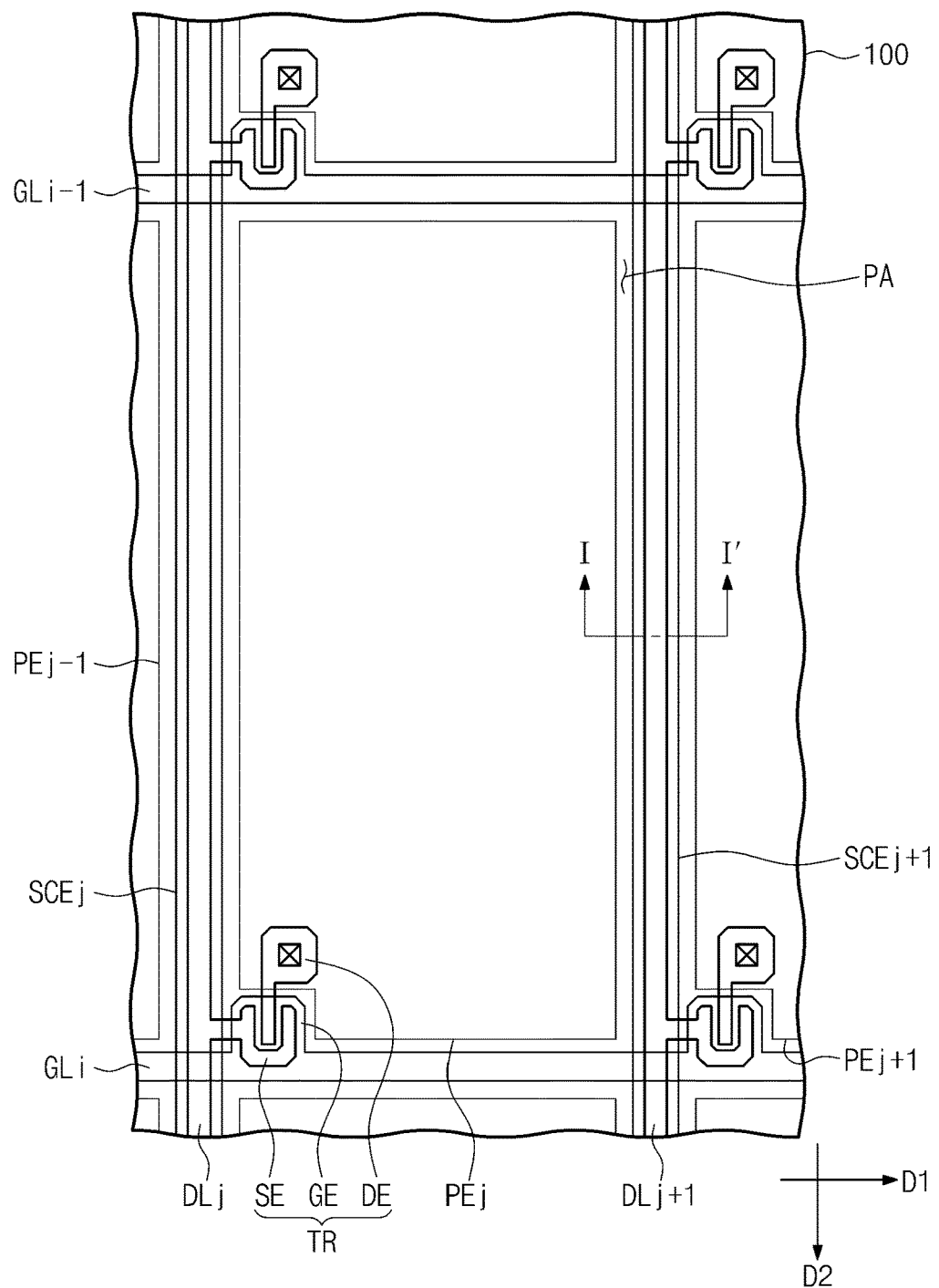
FIG. 2 is a plan view showing an exemplary embodiment of a first substrate, according to the invention.
Figure 3:
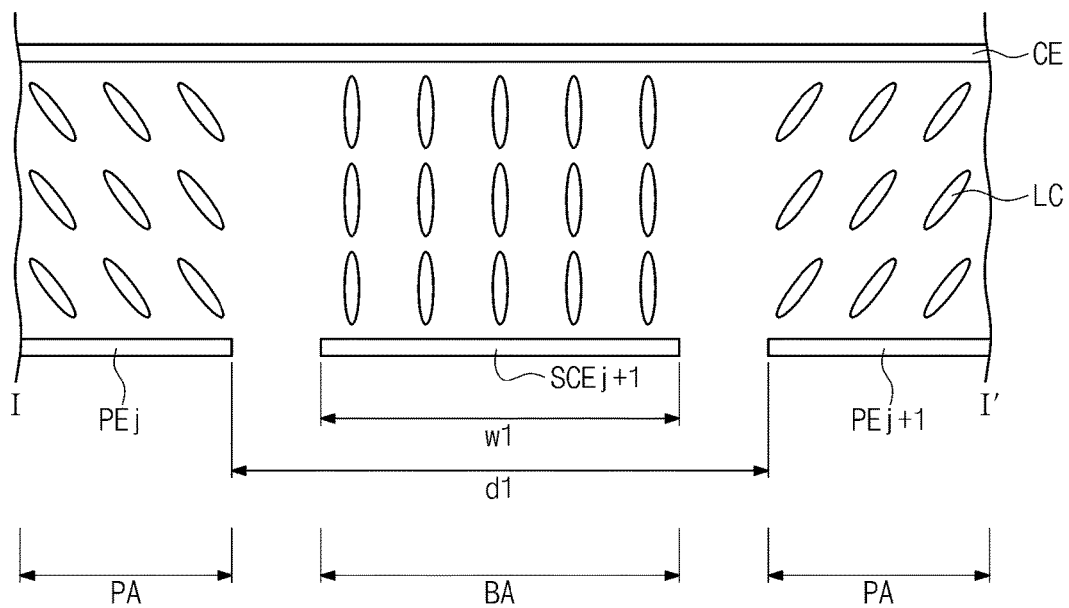
FIG. 3 is a cross-sectional view taken along line I-I' shown in FIG. 2 when an electric field is generated between first and second substrates.

FIG. 2 is a plan view showing an exemplary embodiment of the first substrate, according to the invention, and FIG. 3 is a cross-sectional view taken along line I-I' shown in FIG. 2 when an electric field is generated between the first and second substrates.

Referring to FIGS. 2 and 3, the first substrate 100 of the curved display device 500 includes first and second gate lines GLi−1 and GLi and first and second data lines DLj and DLj+1 disposed thereon. In an exemplary embodiment, a pixel electrode PEj is disposed in a pixel area PA, which may be defined by the first and second gate lines GLi−1 and GLi and first and second data lines DLj and DLj+1.

The pixel electrode PEj is disposed to be spaced apart from and electrically insulated from other pixel electrodes adjacent thereto in the first direction D1, e.g., a left side pixel electrode PEj−1 and a right pixel electrode PEj+1.

The first substrate 100 further includes a thin film transistor TR electrically connected to the second gate line GLi and the first data line DLj to switch a signal applied to the pixel electrode PEj. In an exemplary embodiment, the thin film transistor TR includes a gate electrode GE branched from the second gate line GLi, a source electrode SE branched from the first data line DLj, and a drain electrode DE electrically connected to the pixel electrode PEj.

The first and second gate lines GLi−1 and GLi extend substantially in the first direction D1, and the first and second data lines DLj and LDj+1 extends substantially in a second direction D2, which is perpendicular to the first direction D1. In an exemplary embodiment, as shown in FIG. 2, the first and second gate lines GLi−1 and GLi and first and second data lines DLj and DLj+1 have a stripe shape, but not being limited thereto. In an alternative exemplary embodiment, the first and second gate lines GLi−1 and GLi and first and second data lines DLj and DLj+1 may have a curved shape.

In an exemplary embodiment, a first shielding electrode SCEj is disposed between the pixel electrode PEj and the left pixel electrode PEj−1, and a second shielding electrode SCEj+1 is disposed between the pixel electrode PEj and the right pixel electrode PEj+1.

The first and second shielding electrodes SCEj and SCEj+1 are disposed along the first and second data lines DLj and DLj+1, respectively, and have a width greater than a width of the first and second data lines DLj and DLj+1. In such an embodiment, the first and second shielding electrodes SCEj and SCEj+1 are disposed to cover the first and second data lines DLj and DLj+1, respectively, when viewed in a plan view.

The first shielding electrode SCEj has the width less than a distance between the pixel electrode PEj and the left pixel electrode PEj−1, and the pixel electrode PEj is electrically insulated from the left pixel electrode PEj−1. The second shielding electrode SCEj+1 has the width less than a distance between the pixel electrode PEj and the right pixel electrode PEj+1, and the pixel electrode PEj is electrically insulated from the right pixel electrode PEj+1.

As shown in FIG. 3, when the distance between the pixel electrode PEj and the right pixel electrode PEj+1 is referred to as "d1", the second shielding electrode SCEj+1 has the width w1 less than "d1".

In an exemplary embodiment, the second substrate 300 includes a common electrode CE facing the pixel electrode PEj. The liquid crystal layer LC is interposed between the pixel electrode PE and the common electrode CE, and liquid crystal molecules of the liquid crystal layer LC are aligned by an electric field generated between the pixel electrode PE and the common electrode CE. The common electrode CE is applied with a common voltage, and the pixel electrode PE is applied with a data voltage from the first data line DLj.

Therefore, the electric field generated between the pixel electrode PE and the common electrode CE has an intensity corresponding to an electric potential difference between the common voltage and the data voltage, and the alignment of the liquid crystal molecules of the liquid crystal layer LC is varied in accordance with the intensity of the electric field, thereby controlling the light transmittance of the liquid crystal layer LC.

In such an embodiment, light provided to the liquid crystal layer LC may be light provided from a backlight assembly (not shown) disposed below the first substrate 100.

In an exemplary embodiment, the first and second shielding electrodes SCEj and SCEj+1 are applied with a voltage having a black grayscale. In one exemplary embodiment, for example, the voltage applied to the first and second shielding electrodes SCEj and SCEj+1 may have substantially the same electric potential as the common voltage applied to the common electrode CE. Accordingly, as shown in FIG. 3, the electric field is not generated between the second shielding electrode SCEj+1 and the common electrode CE. In such an embodiment, when the liquid crystal layer LC includes negative liquid crystal molecules, the liquid crystal molecules are substantially vertically aligned with respect to the surface of the second shielding electrode SCEj+1 in a non-electric field state.

As described above, when the liquid crystal molecules are substantially vertically aligned, the light provided from the backlight assembly may be blocked by the vertically-aligned liquid crystal molecules. Thus, the area in which the first and second shielding electrodes SCEj and SCEj+1 are disposed may become a light blocking area BA that blocks the light provided from the backlight assembly.

As described above, in an exemplary embodiment, where the first and second shielding electrodes SCEj and SCEj+1 are disposed along the first and second data lines DLj and DLj+1, the light blocking area BA may be defined along the second direction D2.

In such an embodiment, the second substrate 300 may not include a black matrix in a region corresponding to the light blocking area of the first substrate 100, in which the first and second shielding electrodes SCEj and SCEj+1 are disposed.

Therefore, in such an embodiment, where the pixel electrode PEj and the first and second shielding electrodes SCEj and SCEj+1 are disposed on the first substrate 100, the light blocking area BA may be effectively prevented from moving inside the pixel area PA even when the misalignment occurs between the first substrate 100 and the second substrate 300. Thus, a vertical dark portion that appears in a line shape may be effectively prevented from being formed in the pixel area PA along a direction, to which the curved display device 500 is curved, e.g., the second direction D2 vertical to the first direction D1.

Figure 4:
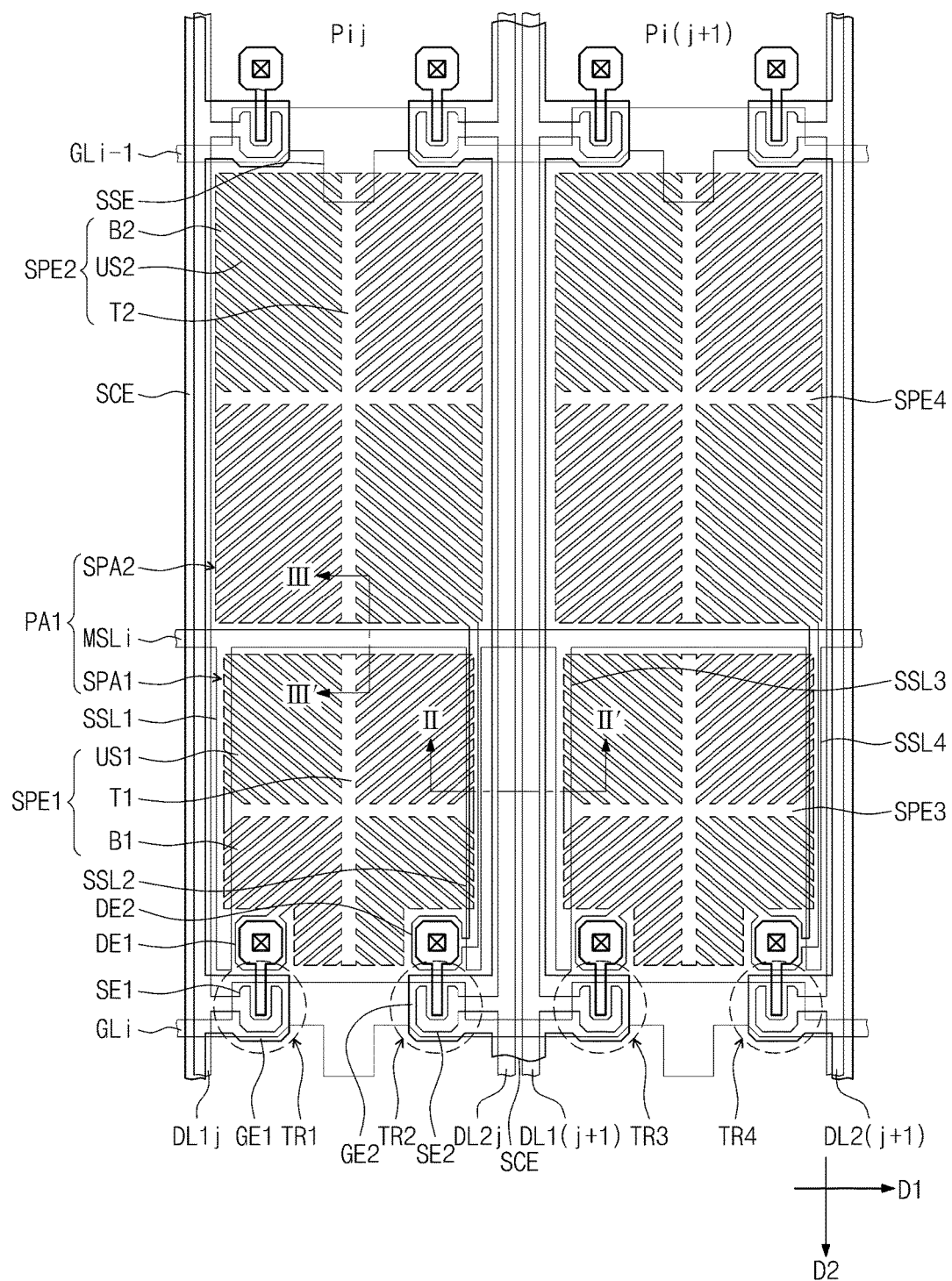
FIG. 4 is a plan view showing an exemplary embodiment of a curved display device, according to the invention.
Figure 5A:
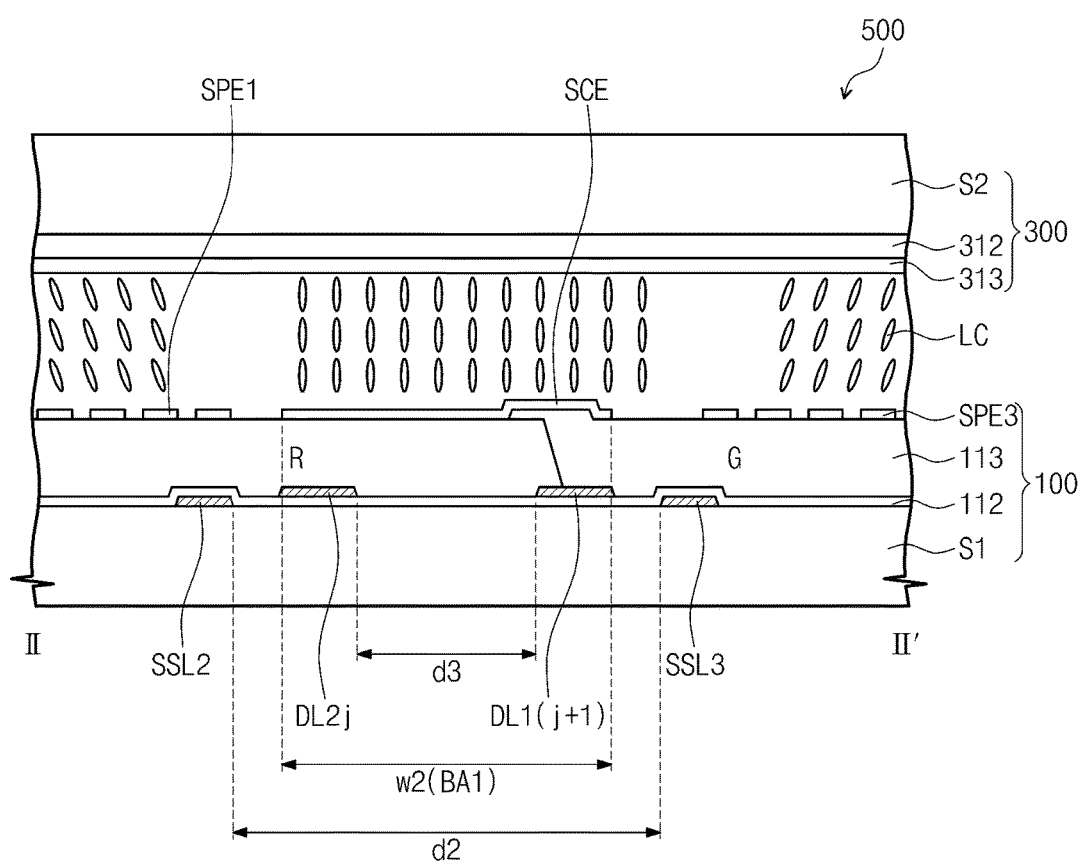
FIG. 5A is a cross-sectional view taken along line II-II' shown in FIG. 4.
Figure 5B:
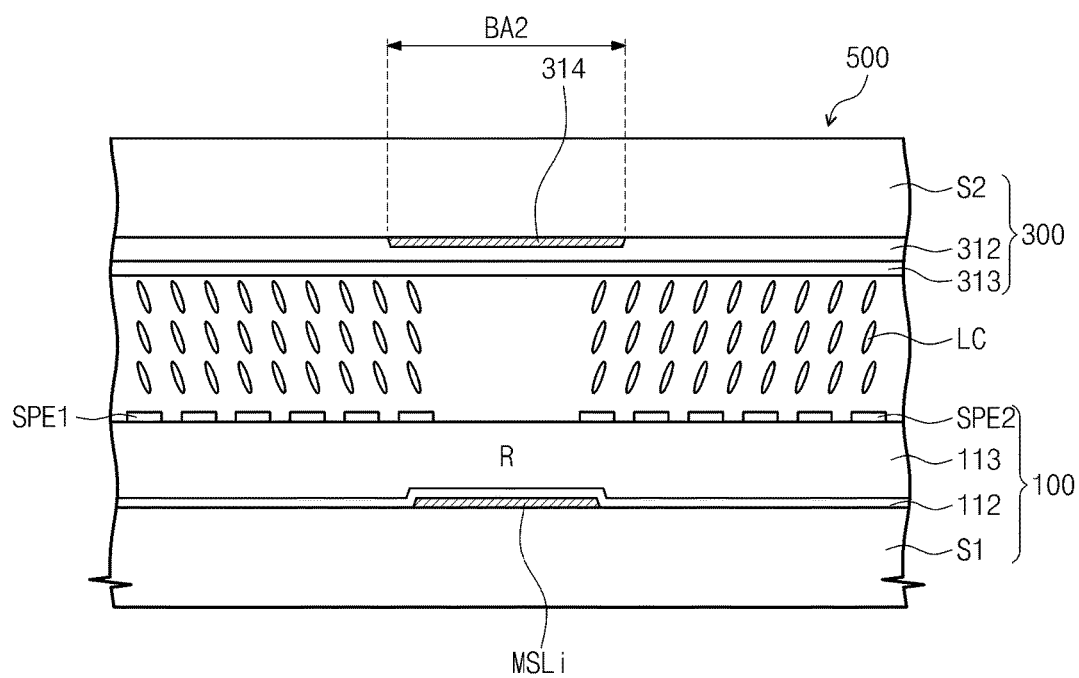
FIG. 5B is a cross-sectional view taken along line III-III' shown in FIG. 4.

FIG. 4 is a plan view showing an exemplary embodiment of a curved display device, according to the invention, FIG. 5A is a cross-sectional view taken along line II-II' shown in FIG. 4, and FIG. 5B is a cross-sectional view taken along line III-III' shown in FIG. 4.

The curved display device 500 includes a plurality of pixels, in which the pixels have substantially the same structure and function as each other. Accordingly, for convenience of illustration, FIG. 4 shows only two pixels, e.g., first and second pixels Pij and Pi(j+1), arranged in the first direction D1.

Referring to FIGS. 4, 5A and 5B, an exemplary embodiment of the curved display device 500 includes a first substrate 100, a second substrate 300 disposed opposite to, e.g., facing, the first substrate 100, and a liquid crystal layer LC interposed between the first substrate 100 and the second substrate 300.

The first substrate 100 includes a first base substrate S1, first and second gate lines GLi−1 and GLi, first, second, third and fourth data lines DL1$j$, DL2$j$, DL1($j$+1) and DL2($j$+1), and a storage line.

The first base substrate S1 may be an insulating substrate having a light transmitting property and a flexible property, such as a plastic substrate, for example. In one exemplary embodiment, for example, the first pixel Pij is disposed in a first pixel area defined by the first and second gate lines GLi−1 and GLi and the first and second data lines DL1$j$ and DL2$j$, and a second pixel Pi($j$+1) is disposed in a second pixel area defined by the first and second gate line GLi−1 and GLi and the third and fourth data lines DL1($j$+1) and DL2($j$+1).

The first pixel Pij includes first and second thin film transistors TR1 and TR2, and first and second sub-pixel electrodes SPE1 and SPE2, and the second pixel Pi($j$+1) includes third and fourth thin film transistors TR3 and TR4, and third and fourth sub-pixel electrodes SPE3 and SPE4.

A shielding electrode SCE is disposed between the first and second pixels Pij and Pi($j$+1). The shielding electrode SCE extends substantially in a second direction D2, which is perpendicular to a first direction D1.

As shown in FIG. 4, the first and second gate lines GLi−1 and GLi extend substantially in the first direction D1 and the first to fourth data lines DL1$j$, DL2$j$, DL1($j$+1) and DL2($j$+1) extend substantially in the second direction D2, which is perpendicular to the first direction D1. The first and second gate lines GLi−1 and GLi are insulated from the first to fourth data lines DL1$j$, DL2$j$, DL1($j$+1) and DL2($j$+1) while crossing the first to fourth data lines DL1$j$, DL2$j$, DL1($j$+1) and DL2($j$+1) by a gate insulating layer 112.

The first thin film transistor TR1 includes a first gate electrode GE1 branched from the second gate line GLi, a first source electrode SE1 branched from the first data line DL1$j$, and a first drain electrode DE1 spaced apart from the first source electrode SE1 by a predetermined distance. The second thin film transistor TR2 includes a second gate electrode GE2 branched from the second gate line GLi, a second source electrode SE2 branched from the second data line DL2$j$, and a second drain electrode DE2 spaced apart from the second source electrode SE2 by a predetermined distance.

The first pixel area PA1 includes two sub-pixel areas arranged in the second direction D2, e.g., a first sub-pixel area SPA1 and a second sub-pixel area SPA2. In an exemplary embodiment, the first sub-pixel area SPA1 may have a size different from a size of the second sub-pixel area SPA2. In one exemplary embodiment, for example, the first sub-pixel area SPA1 may be smaller than the second sub-pixel area SPA2.

The first sub-pixel electrode SPE1 is disposed in the first sub-pixel area SPA1 and electrically connected to the first drain electrode DE1 of the first thin film transistor TR1. The second sub-pixel electrode SPE2 is disposed in the second sub-pixel area SPA2 and electrically connected to the second drain electrode DE2 of the second thin film transistor TR2.

The first sub-pixel electrode SPE1 includes a first trunk portion T1 and a plurality of first branch portions B1 extending from the first trunk portion T1 in a radial form to divide the first sub-pixel area SPA1 into a plurality of domains. In an exemplary embodiment, as shown in FIG. 4, the first trunk portion T1 has a cross shape, and thus the first sub-pixel area SPA1 is divided into four domains by the first trunk portion T1. The first branch portions B1 extend in directions substantially parallel to each other and arranged to be spaced apart from each other in each domain defined by the first trunk portion T1. In one exemplary embodiment, for example, the first branch portions B1 may extend in a direction inclined at about 45 degrees with respect to the first trunk portion T1. In an exemplary embodiment, the first branch portions B1, which are adjacent to each other, are spaced apart from each other by a distance of micrometers (e.g., a few, several or tens of micrometers) such that a plurality of first fine slits US1 is defined in the first branch portions B1. Due to the first fine slits US1, the liquid crystal molecules of the liquid crystal layer LC are pre-tilted in different directions in the domains.

The second sub-pixel electrode SPE2 includes a second trunk portion T2 and a plurality of second branch portions B2 extending from the second trunk portion T2 in a radial form to divide the second sub-pixel area SPA2 into a plurality of domains. In an exemplary embodiment, as shown in FIG. 4, the second trunk portion T2 has a cross shape, and thus the second sub-pixel area SPA2 is divided into four domains by the second trunk portion T2. The second branch portions B2 extend in directions substantially parallel to each other and arranged to be spaced apart from each other in each domain defined by the second trunk portion T2. In an exemplary embodiment, the second branch portions B2, which are adjacent to each other, are spaced apart from each other by a distance of micrometers such that a plurality of second fine slits US2 is defined in the second branch portions B2. Due to the second fine slits US2, the liquid crystal molecules of the liquid crystal layer LC are pre-tilted in different directions in the domains.

The storage line includes a main storage line MSLi, which is disposed between the first sub-pixel area SPA1 and the second sub-pixel area SPA2 and extends substantially in the first direction D1, and first and second sub-storage lines SSL1 and SSL2, which are branched from the main storage line MSLi and extend substantially in the second direction D2.

The main storage line MSLi may partially overlap the first and second sub-pixel electrodes SPE1 and SPE2 when viewed in a plan view. The first and second sub-storage lines SSL1 and SSL2 may partially overlap the first sub-pixel electrode SPE1. In an exemplary embodiment, a distance between the first and second sub-storage lines SSL1 and SSL2 may be less than a distance between the first and second data lines DL1$j$ and DL2$j$, and a width in the first direction D1 of the first sub-pixel electrode SPE1 may be greater than a distance between the first and second sub-storage lines SSL1 and SSL2 and less than the distance between the first and second data lines DL1$j$ and DL2$j$.

In an exemplary embodiment, the first pixel Pij further includes a storage electrode SSE, which is branched from the first gate line GLi−1 and partially overlaps the second sub-pixel electrode SPE2.

The second pixel Pi($j$+1) has substantially the same structure and function as the first pixel Pij, and thus repetitive detailed descriptions of the second pixel Pi($j$+1) will be omitted. The second pixel Pi($j$+1) shares the first and second gate lines GLi−1 and GLi and the main storage line MSLi with the first pixel Pij. In such an embodiment, the second pixel Pi($j$+1) includes third and fourth thin film transistors TR3 and TR4 electrically connected to the third and fourth data lines DL1($j$+1) and DL2($j$+1), and third and fourth sub-pixel electrodes SPE3 and SPE4 electrically connected to the third and fourth thin film transistors TR3 and TR4. In such an embodiment, the second pixel Pi(j+1) includes third and fourth sub-storage lines SSL3 and SSL4.

FIG. 5A shows a cross-sectional structure of a boundary portion between the first pixel Pij and the second pixel Pi(j+1).

Referring to FIG. 5A, the second and third sub-storage lines SSL2 and SSL3 are disposed on the first base substrate S1 together with the first and second gate lines GLi−1 and GLi.

The second and third sub-storage lines SSL2 and SSL3 are covered by the gate insulating layer 112, and the second and third data lines DL2j and DL1(j+1) are disposed on the gate insulating layer 112.

In an exemplary embodiment, a distance d2 between the second and third sub-storage lines SSL2 and SSL3 is greater than a distance d3 between the second and third data lines DL2j and DL1(j+1). When viewed in a plan view, the second sub-storage line SSL2 partially overlaps the second data line DL2 or spaced apart from the second data line DL2 by a predetermined distance. In an exemplary embodiment, the third sub-storage line SSL3 partially overlaps the third data line DL1(j+1) or spaced apart from the third data line DL1(j+1) by a predetermined distance.

The second and third data lines DL2j and DL1(j+1) are covered by an organic insulating layer 113. The organic insulating layer 113 may define a red color pixel R, a green color pixel G and a blue color pixel (not shown). In an exemplary embodiment, the red color pixel R is defined in the first pixel area PA1 and the green color pixel G is defined in the second pixel area PA2.

The first to fourth sub-pixel electrodes SPE1 to SPE4 are disposed on the organic insulating layer 113. When viewed in a plan view, the first sub-pixel electrode SPE1 of the first pixel Pij overlaps the second sub-storage line SSL2, and the third sub-pixel electrode SPE3 of the second pixel Pi(j+1) overlaps the third sub-storage line SSL3.

The first and third sub-pixel electrodes SPE1 and SPE3 are spaced apart from each other in the first direction D1. In an exemplary embodiment, a distance between the first and third sub-pixel electrodes SPE1 and SPE3 is greater than the distance d2 between the second and third sub-storage lines SSL2 and SSL3.

A shielding electrode SCE is disposed between the first pixel Pij and the second pixel Pi(j+1). As shown in FIG. 4, the shielding electrode SCE extends substantially in the second direction D2 along the second and third data lines DL2j and DL1(j+1). The shielding electrode SCE is disposed to be spaced apart from the first and third sub-pixel electrodes SPE1 and SPE3, and thus the shielding electrode SCE is electrically insulated from the first and third sub-pixel electrodes SPE1 and SPE3.

In an exemplary embodiment, the shielding electrode SCE is disposed on the organic insulating layer 113. In such an embodiment, the shielding electrode SCE may include a transparent conductive material, e.g., indium tin oxide ("ITO"), indium zinc oxide ("IZO"), etc., as the first and third sub-pixel electrodes SPE1 and SPE3.

A width w2 in the first direction D1 of the shielding electrode SCE may be less than the distance between the first and third sub-pixel electrodes SPE1 and SPE3 and greater than the distance d3 between the second and third data lines DL2j and DL1(j+1).

In such an embodiment, the width w2 of the shielding electrode SCE may be equal to or greater than a sum of the distance d3 between the second and third data lines DL2j and DL1(j+1), the width of the second data line DL2j and the width of the third data line DL1(j+1).

A method of determining the width w2 of the shielding electrode SCE will be described in detail with reference to FIG. 8.

In an exemplary embodiment, as shown in FIGS. 5A and 5B, the shielding electrode SCE and the first to fourth sub-pixel electrodes SPE1 to SPE4 are disposed on a same layer as each other. In an alternative exemplary embodiment, the shielding electrode SCE may be disposed on a difference layer from the first to fourth sub-pixel electrodes SPE1 to SPE4. In one exemplary embodiment, for example, the shielding electrode SCE may be disposed on the organic insulating layer 113, the shielding electrode SCE may be covered by an inter-insulating layer (not shown), and the first to fourth sub-pixel electrodes SPE1 to SPE4 may be disposed on the inter-insulating layer.

Figure 6:
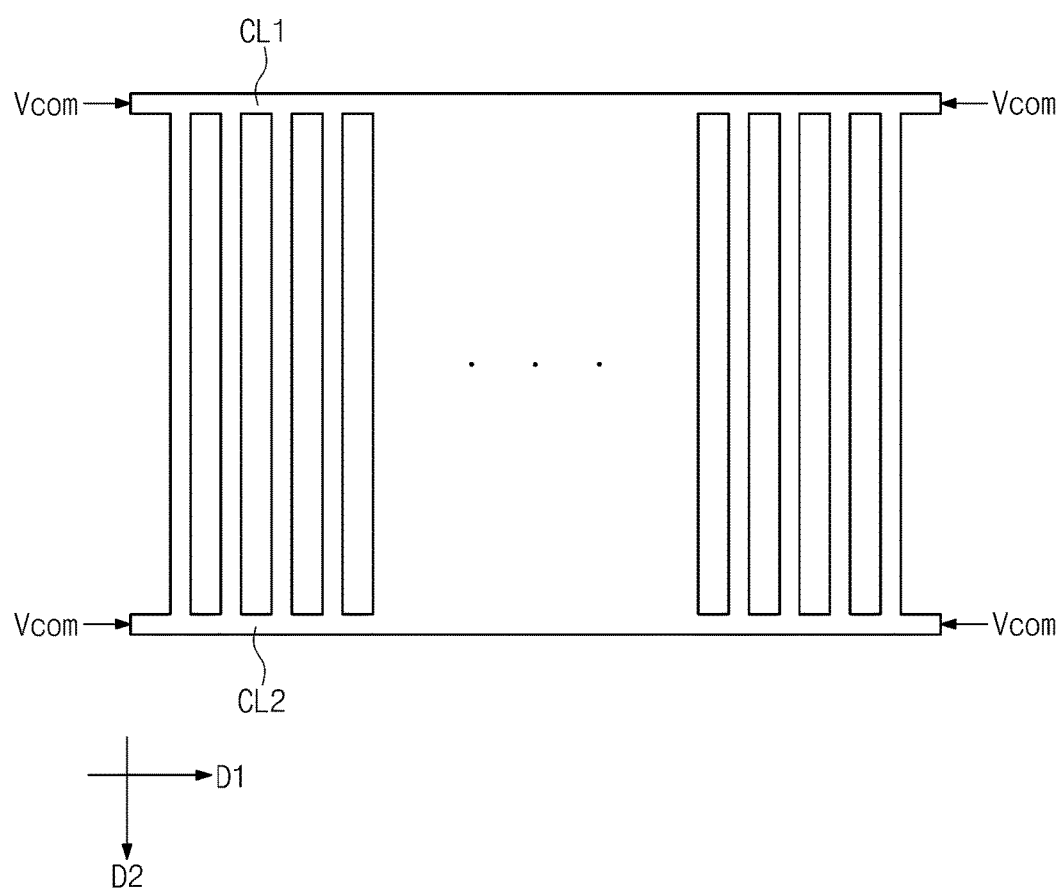
FIG. 6 is a plan view showing an exemplary embodiment of a shielding electrode.

FIG. 6 is a plan view showing an exemplary embodiment of the shielding electrode.

Referring to FIGS. 4 and 6, a plurality of shielding electrodes SCE are disposed on the first substrate 100, and the shielding electrodes SCE extend substantially in the second direction D2 to be substantially parallel to each other and arranged substantially in the first direction D1. Each of the shielding electrodes SCE may be disposed adjacent to a boundary between pixel columns.

The shielding electrodes SCE are connected to each other by first and second connection lines CL1 and CL2. In such an embodiment, the first connection line CL1 is commonly connected to first end portions of the shielding electrodes SCE and the second connection line CL2 is commonly connected to second end portions of the shielding electrodes SCE.

In an exemplary embodiment, as shown in FIG. 6, the first and second connection lines CL1 and CL2 are integrally formed with the shielding electrodes SCE as a single unitary and indivisible unit, but not being limited thereto or thereby. In an alternative exemplary embodiment, the first and second connection lines CL1 and CL2 may be disposed on the same layer as the storage line MSLi and SSL1 to SSL4, and then electrically connected to the shielding electrodes SCE through contact holes.

In an exemplary embodiment, the first and second connection lines CL1 and CL2 are connected to both ends of the shielding electrodes SCE, respectively. In an alternative exemplary embodiment, only one of the first and second connection lines CL1 and CL2 may be disposed on the first substrate 100.

The first and second connection lines CL1 and CL2 receive a voltage (hereinafter, referred to as common voltage Vcom) having the same electric potential as the common voltage Vcom from an external source (not shown). According to another exemplary embodiment, the first and second connection lines CL1 and CL2 may be applied with a voltage having different electric potential from the common voltage Vcom.

Referring back to FIG. 5A, the second substrate 300 includes a second base substrate S2, an overcoating layer 312 and a common electrode 313. The common electrode 313 receives the common voltage Vcom and is disposed to face the first to fourth sub-pixel electrodes SPE1 to SPE4, and thus the electric field is generated between the common electrode 313 and the first to fourth sub-pixel electrodes SPE1 to SPE4. In an exemplary embodiment, the common electrode 313 may be integrally formed as a single unitary and individual unit.

The shielding electrode SCE is applied with the voltage having substantially the same electric potential as the common voltage Vcom applied to the common electrode 313.

Accordingly, the electric field is effectively prevented from being generated between the shielding electrode SCE and the common electrode 313. In such an embodiment, when the liquid crystal layer LC includes the negative liquid crystal molecules, the liquid crystal molecules are substantially vertically aligned with respect to the surface of the shielding electrode SCE in the non-electric field state.

As described above, when the liquid crystal molecules are substantially vertically aligned, the light provided from the backlight assembly may be blocked by the vertically-aligned liquid crystal molecules. Thus, the area, in which the shielding electrode SCE is disposed, may function as a first light blocking area BA1 that blocks the light provided from the backlight assembly.

As described above, in such an embodiment, where the shielding electrode SCE is disposed along the first and second data lines DL2j and DL1(j+1), the first light blocking area BA1 may be disposed in the second direction D2.

The second substrate 300 may not include a black matrix in a region corresponding to the area in which the shielding electrode SCE is disposed.

Therefore, in such an embodiment, where the shielding electrode is disposed on the first substrate 100, the first light blocking area BA1 may be effectively prevented from moving inside the pixel area PA even though the misalignment occurs between the first substrate 100 and the second substrate 300. Thus, the vertical dark portion that appears in the line shape may be effectively prevented from being formed in the pixel area PA along the direction to which the curved display device 500 is curved, e.g., the second direction D2 vertical to the first direction D1.

Referring again to FIGS. 4 and 5B, the second substrate 300 further includes a black matrix 314. The black matrix 314 includes a material that blocks the light incident thereon, and thus the black matrix 314 blocks the transmission of light incident thereon, e.g., light leakage.

The black matrix 314 is disposed along the main storage line MSLi and the first and second gate lines GLi−1 and GLi, such that the black matrix 314 has a stripe shape extending substantially in the first direction D1.

In an exemplary embodiment of the curved display device 500, which is curved in the first direction D1, the misalignment does not occur between the first and second substrates 100 and 300 in the second direction D2. Therefore, the black matrix 314 disposed on the second substrate 300 extends substantially in the first direction D1 and thereby defines a second light blocking area BA2. In such an embodiment, the second light blocking area BA2 is disposed substantially in the first direction D1.

The black matrix 314 may be omitted in an area of the second substrate 300, which corresponds to the first light blocking area BA1 defined by the shielding electrode SCE disposed on the first substrate 100.

In an exemplary embodiment, the shielding electrode SCE and the black matrix 314 are disposed in areas in which the first to fourth data lines DL1j, DL2j, DL1(j+1) and DL2(j+1) cross the first and second gate lines GL1−1 and GLi and the main storage line MSLi.

In an exemplary embodiment, as shown in FIGS. 5A and 5B, the overcoating layer 312 may compensate a step difference caused by the black matrix 314. Accordingly, the common electrode 313 may be disposed on the overcoating layer 312 having a substantially uniform or even surface, and thus the distance between the common electrode 313 and the first to fourth sub-pixel electrodes SPE1 to SPE4 may be substantially uniformly maintained.

In an exemplary embodiment shown in FIGS. 4 to 6, the curved display device 500 may be curved in one specific direction, e.g., the first direction D1. In an alternative exemplary embodiment, the curved display device 500 may be curved in the first and second directions D1 and D2 or a semi-spherical shape, and the shielding electrode SCE may be disposed substantially in the first and second directions D1 and D2. In such an embodiment, the black matrix 314 disposed on the second substrate 300 may be omitted.

Figure 7A:
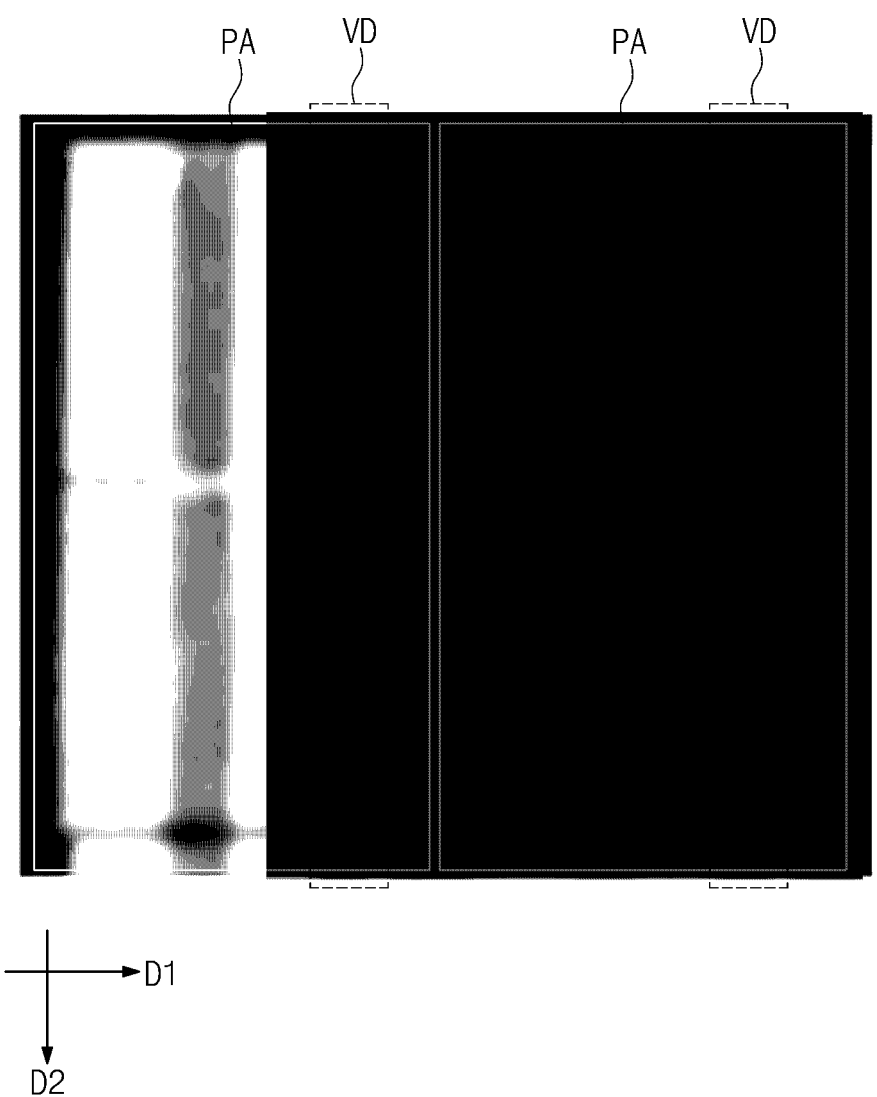
FIG. 7A is a view showing a pixel in which vertical line defects occur.
Figure 7B:
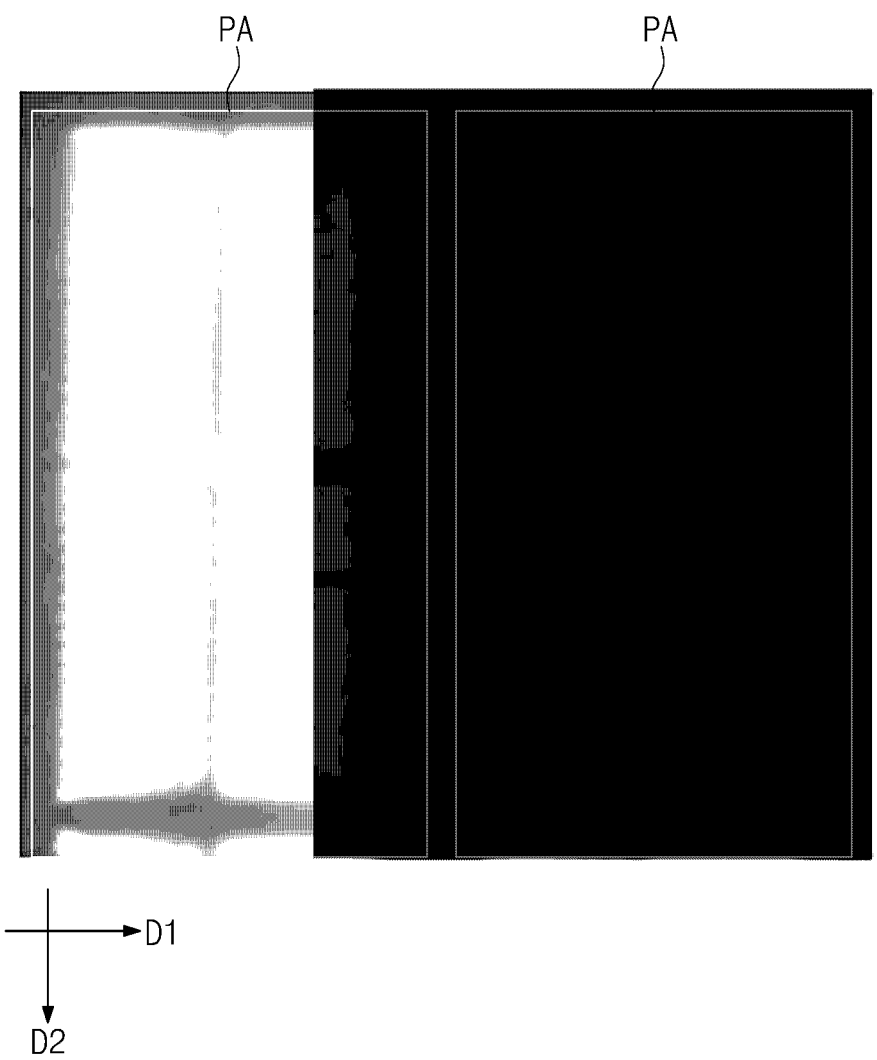
FIG. 7B is a view showing an exemplary embodiment of a pixel including the shielding electrode.

FIG. 7A is view showing a pixel in which vertical line defects occur, and FIG. 7B is a view showing a pixel including the shielding electrode.

FIG. 7A shows a brightness of the pixel, which is measured when the black matrix having the mesh shape and extending substantially in the first and second directions D1 and D2 is disposed on the second substrate 300 while the curved display device 500 is curved in the first direction D1. According to FIG. 7A, when the first and second substrates 100 and 300 are misaligned with each other, the misalignment occurs between the black matrix and the data line, which are disposed in the second direction D2. As a result, the vertical dark portion VD of the line shape is generated in the pixel area PA due to the black matrix.

As shown in FIG. 7B, in an exemplary embodiment, when the black matrix 314 (refer to FIG. 5B) having the stripe shape and extending substantially in the first direction D1 is disposed on the second substrate 300 and the shielding electrode SCE (refer to FIG. 4) extending substantially in the second direction D2 is disposed on the first substrate 100 along the data line, the vertical dark portion VD of the line shape is not generated except for the boundary portion between the domains in the pixel area PA.

As described above, in an exemplary embodiment, the vertical dark portion VD of the line shape is effectively prevented from being formed in the pixel area PA by the shielding electrode SCE, the display quality of the curved display device 500 may be substantially improved.

Figure 8:
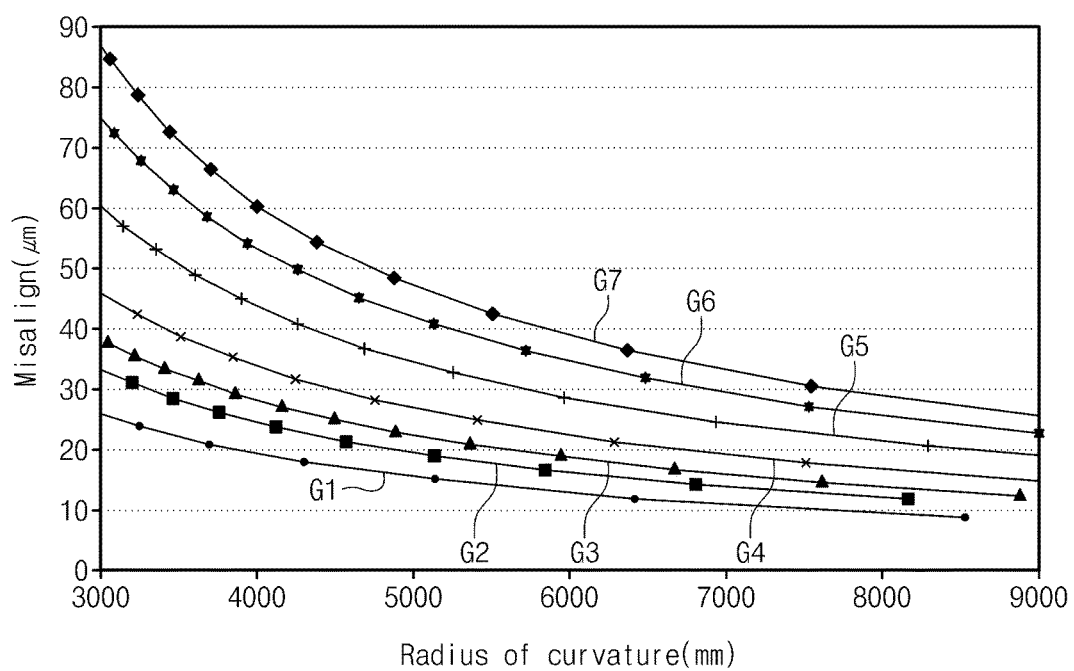
FIG. 8 is a graph of misalignment value versus radius of curvature of the curved display devices having various panel sizes.

FIG. 8 is a graph of misalignment value versus radius of curvature of the curved display devices having various panel sizes.

In FIG. 8, an x-axis indicates the radius of curvature (millimeter: mm) of the curved display device 500 and a y-axis indicates a misalignment value (micrometer: μm) between the first substrate 100 and the second substrate 300. In FIG. 8, first to seventh graphs G1 to G7 represent the misalignment value versus the radius of curvature of the curved display devices having 32-inch, 40-inch, 46-inch, 55-inch, 70-inch, 85-inch and 95-inch panels, respectively. The radius of curvature is inversely proportional to the curvature.

As shown in FIG. 1B, the distance between the first position P1 and the third position P3 may be defined as the misalignment value between the first substrate 100 and the second substrate 300.

Referring to FIG. 8, the misalignment value is decreased as the radius of curvature is increased, and the misalignment value is increased as the panel size is increased. Therefore, the width w2 of the shielding electrode SCE is determined based on the radius of curvature and the panel size of the curved display device 500.

The width w2 of the shielding electrode SCE may be a value that satisfies the following Equation.

$$w2 = C1 + \alpha(R) + \beta(S) + \gamma(S^2) + \delta(R \times S) \quad \text{Equation}$$

In Equation, each of C1, α, β, γ, δ denotes a constant, R denotes the radius of curvature, and S denotes the panel size. Each of C1, α, β, γ, δ may have a predetermined value.

TABLE 1

| | 4000R (mm) | | |
|---|---|---|---|
| Panel size (inch) | Center value of width of the shield electrode (μm) | Minimum value of width of shielding electrode (μm) | Maximum value of width of shielding electrode (μm) |
| 32 | 19 | 9 | 29 |
| 40 | 25 | 15 | 35 |
| 46 | 29 | 19 | 39 |
| 55 | 36 | 26 | 46 |
| 65 | 44 | 34 | 54 |
| 70 | 48 | 38 | 58 |
| 85 | 60 | 50 | 70 |
| 95 | 69 | 59 | 79 |

According to Table 1, when the radius of curvature is about 4,000 mm, the width w2 of the shielding electrode SCE is determined for each panel size. The misalignment value may be varied not only by the radius of curvature and the panel size but also by a thickness of the panel or a structure of a spacer disposed in the panel. Thus, a tolerance range of the width w2 may be set based on is the value set by the Equation.

According to Table 1, when the radius of curvature is about 4,000 mm and the panel size is about 32-inch, the width w2 of the shielding electrode SCE is about 19 μm. The width w2 of the shielding electrode SCE is set to values in the tolerance range after a value less than the center value (19 μm) by about 10 μm is set to the minimum value (9 μm) of the tolerance range and a value greater than the center value (19 μm) by about 10 μm is set to the maximum value (29 μm) of the tolerance range.

However, the minimum value less than the center value by about 10 μm and the maximum value larger than the center value by about 10 μm should not be limited thereto or thereby. In one exemplary embodiment, for example, when t denotes a predetermined thickness value, a difference in the misalignment value between when the thickness of the curved display panel is about 0.5t and when the thickness of the curved display panel is about 0.7t is about 10 μm under the condition that the panel size is constant. As described above, since the misalignment value is varied even though the panel size is constant, the tolerance range of the width w2 of the shielding electrode SCE may be set based on the misalignment value difference by the thickness. In such an embodiment, when the misalignment value caused by the thickness is referred to as a reference value, the tolerance range of the width of the shielding electrode may have a value obtained by subtracting the reference value from the calculated center value as the minimum value thereof and a value obtained by adding the reference value to the calculated center value as the maximum value thereof.

In an exemplary embodiment of the curved display device having other panel size, the width w2 of the shielding electrode SCE may be set to a value in the tolerance range, a center value of which is the calculated width w2 from the Equation above.

TABLE 2

| | 5000R (mm) | | |
|---|---|---|---|
| Panel size (inch) | Center value of width of the shield electrode (μm) | Minimum value of width of shielding electrode (μm) | Maximum value of width of shielding electrode (μm) |
| 32 | 13 | 3 | 23 |
| 40 | 17 | 7 | 27 |
| 46 | 21 | 11 | 31 |
| 55 | 27 | 17 | 37 |
| 65 | 34 | 24 | 44 |
| 70 | 37 | 27 | 47 |
| 85 | 48 | 38 | 58 |
| 95 | 55 | 45 | 65 |

As represented in Table 2, when the radius of curvature is increased to about 5,000 mm, the curvature is decreased, and thus the misalignment value is reduced relative to the value when the radius of curvature is about 4,000 mm. Therefore, the width w2 of the shielding electrode SCE may be reduced.

The tolerance range of the width w2 may be set based on the width w2 of the shielding electrode SCE, which is calculated by the Equation. That is, the width w2 of the shielding electrode SCE may be set to a value in the tolerance range, a center value of which is the calculated width w2 from the Equation.

In an exemplary embodiment, the minimum value of the tolerance range may be set to a value less than the center value by about 10 μm and the maximum value of the tolerance range may be set to a value greater than the center value by about 10 μm, but the tolerance range should not be limited thereto or thereby. That is, the tolerance range may be set based on other variables, e.g., the thickness of the panel or the structure of spacer.

Figure 9:
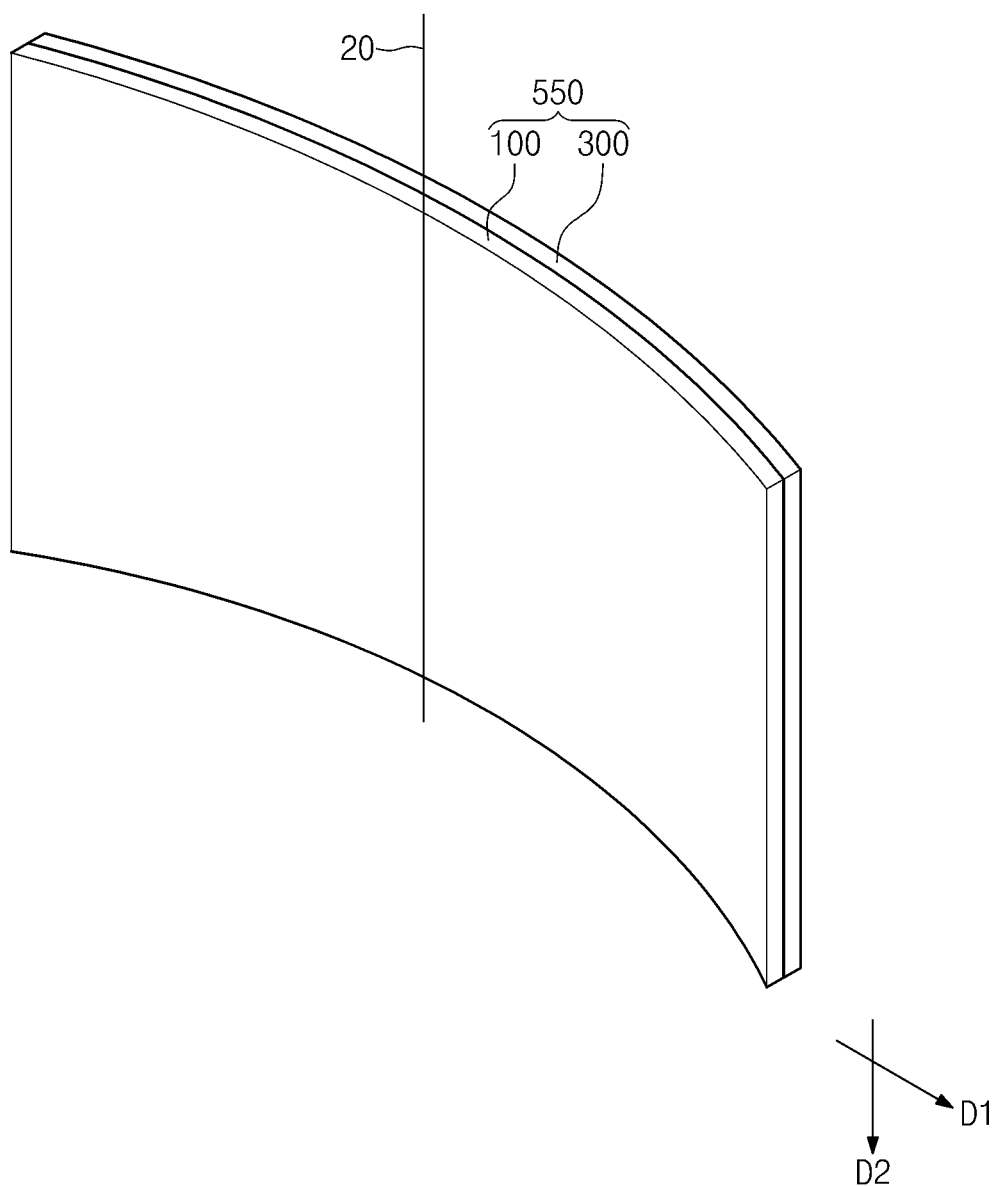
FIG. 9 is a perspective view showing an alternative exemplary embodiment of a curved display device, according to the invention.

FIG. 9 is a perspective view of an alternative exemplary embodiment of a curved display device 550, according to the invention.

Referring to FIG. 9, the curved display device 550 is curved in a first direction D1 and has variable curvature in a second direction D2 substantially perpendicular to the first direction D1.

In an exemplary embodiment, the curvature of the curved display device 550 is varied along an imaginary line 20 substantially in parallel to the second direction D2. In such an embodiment, the curvature of an upper portion of the curved display device 550 on the imaginary line 20 may be relatively less than the curvature of a lower portion of the curved display device 550 on the imaginary line 20. In such an embodiment, the curvature of the curved display device 550 may gradually increase from the upper portion of the curved display device 550 toward the lower portion of the curved display device 550.

In such an embodiment, the width w2 of the shielding electrode SCE may be set to an average value of a first width determined by the curvature of the upper portion and a second width determined by the curvature of the lower portion. In such an embodiment, the tolerance range of the width w2 may be set to have the average value as the center value thereof.

According to an alternative exemplary embodiment, the width w2 of the shielding electrode SCE may be set to the first width determined by the curvature of the upper portion. In such an embodiment, the tolerance range of the width w2 may be set to have the first width as the center value thereof.

Figure 10:
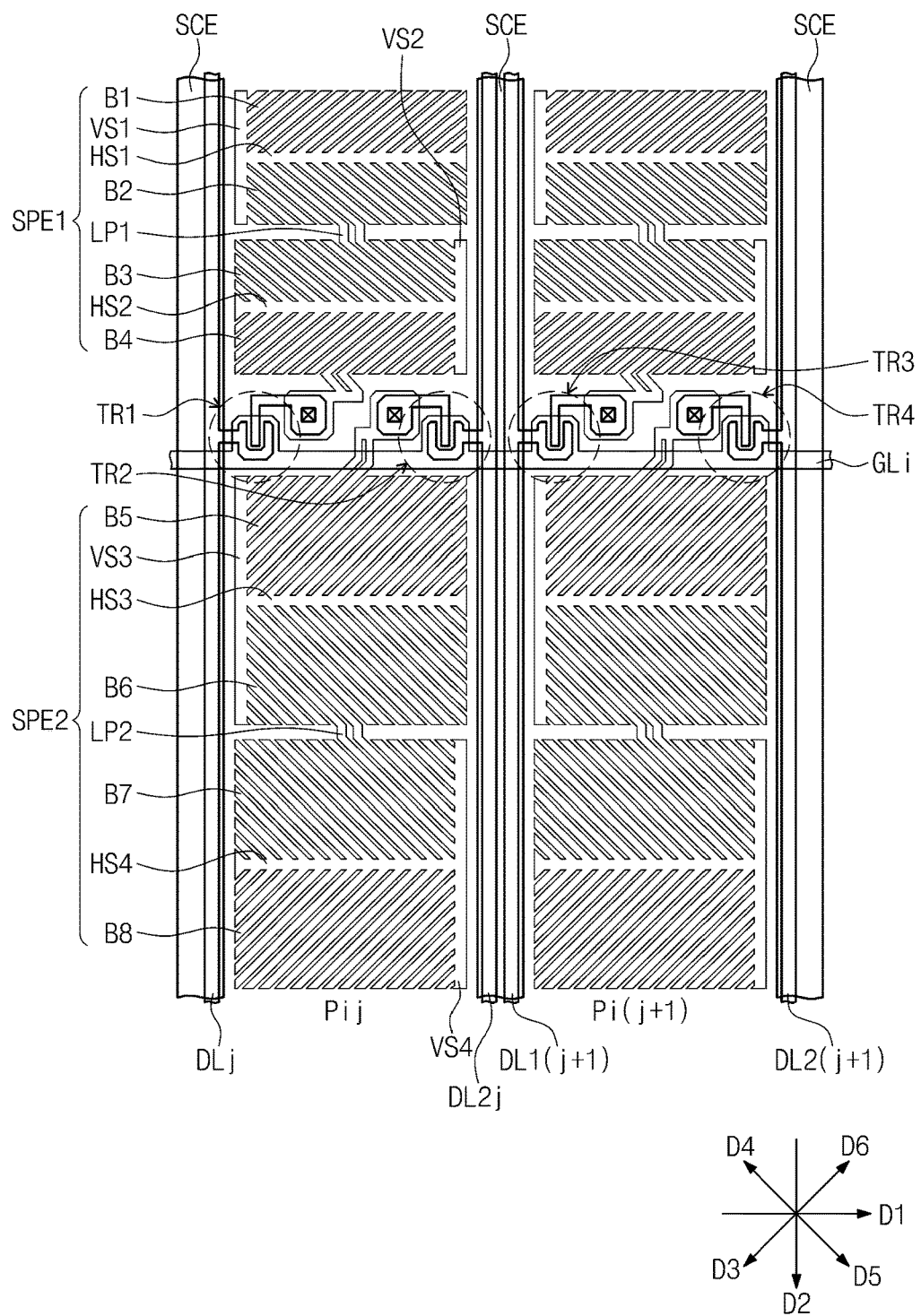
FIG. 10 is a plan view showing a pixel structure of an alternative exemplary embodiment of a curved display device, according to the invention.
Figure 11:
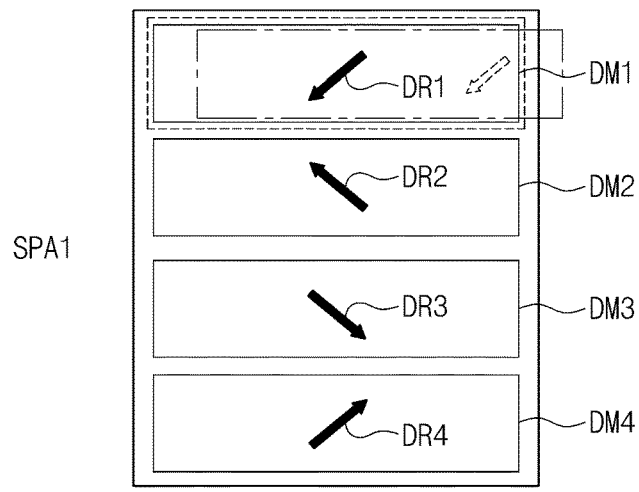
FIG. 11 is a view showing domains and liquid crystal alignment directions, which are defined in pixel areas.
Figure 11:
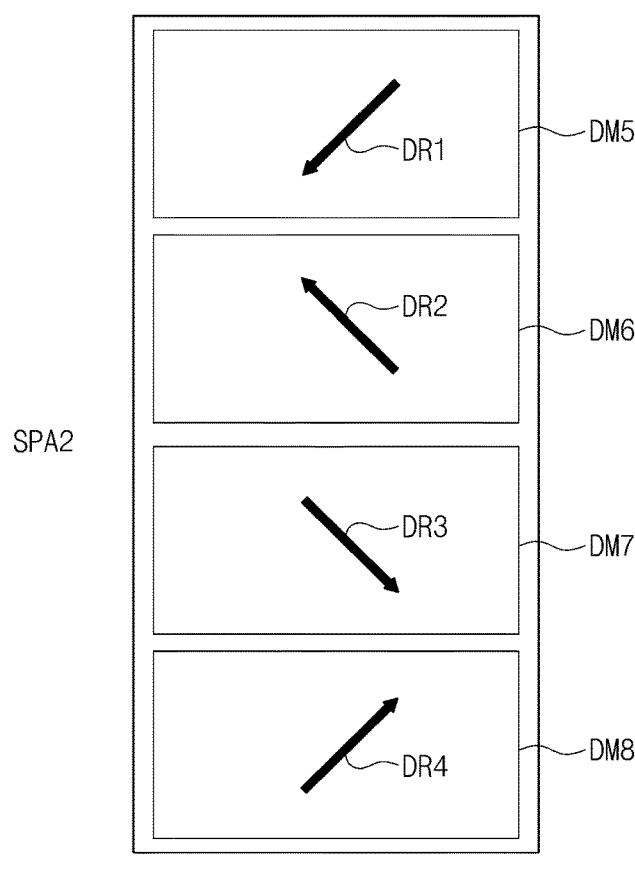
Figure 11:
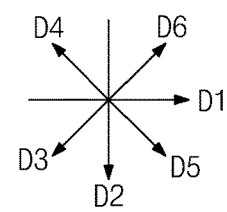

FIG. 10 is a plan view showing a pixel structure of an alternative exemplary embodiment of a curved display device, according to the invention, and FIG. 11 is a view showing domains and liquid crystal alignment directions, which are defined in pixel areas. The same or like elements shown in FIGS. 10 and 11 have been labeled with the same reference characters as used above to describe the exemplary embodiment of the curved display device shown in FIG. 4, and any repetitive detailed descriptions thereof will be omitted or simplified.

Referring to FIG. 10, the first sub-pixel electrode SPE1 includes a first horizontal trunk portion HS1, a second horizontal trunk portion HS2, a first vertical trunk portion VS1, and a second vertical trunk portion VS2, and first, second, third and fourth branch portions B1, B2, B3 and B4.

The first vertical horizontal portion VS1 is connected to the first horizontal trunk portion HS1, edges of the first branch portions B1, and edges of the second branch portions B2, and the second vertical horizontal portion VS2 is connected to the second horizontal trunk portion HS2, edges of the third branch portions B3, and edges of the fourth branch portions B4. The first and second vertical branch portions VS1 and VS2 extend substantially in the second direction D2, and the second direction D2 crosses the first direction D1 in which the curved display device 500 is curved. In one exemplary embodiment, for example, the second direction D2 may be substantially perpendicular to the first direction D1 when viewed in a plan view.

The first horizontal trunk portion HS1 is connected to the first vertical trunk portion VS1, edges of the first branch portions B1, and edges of the second branch portions B2. The first horizontal trunk portion HS1 extends in the first direction D1 and branched from a center portion of the first vertical trunk portion VS1. The first branch portions B1 may have a shape substantially symmetrical to a shape of the second branch portions B2 with respect to the first horizontal trunk portion HS1.

As shown in FIG. 11, the first horizontal trunk portion HS1 may be disposed between first and second domains.

The second horizontal trunk portion HS2 is connected to the second vertical trunk portion VS2, edges of the third branch portions B3 and edges of the fourth branch portions B4. The second horizontal trunk portion HS2 extends substantially in the first direction D1 and branched from a center portion of the second vertical trunk portion VS2. The third branch portions B3 may have a shape substantially symmetrical to a shape of the fourth branch portions B4 with respect to the second horizontal trunk portion HS2.

As shown in FIG. 11, the second horizontal trunk portion HS2 may be disposed between the third and fourth domains.

In an exemplary embodiment, as shown in FIG. 10, a portion of the first branch portions B1 is branched from the first horizontal trunk portion HS1 and the other portion of the first branch portions B1 is branched from the first vertical trunk portion VS1. In such an embodiment, the first branch portions B1 extend substantially in a third direction D3 inclined with respect to the first direction D1 and the second direction D2 and arranged to be spaced apart from each other when viewed in a plan view In such an embodiment, a portion of the second branch portions B2 is branched from the first horizontal trunk portion HS1 and the other portion of the second branch portions B2 is branched from the first vertical trunk portion VS1. In such an embodiment, the second branch portions B2 extend substantially in a fourth direction D4 inclined with respect to the first and second directions D1 and D2 and arranged to be spaced apart from each other when viewed in a plan view.

When viewed in a plan view, the fourth direction D4 crosses the third direction D3. In one exemplary embodiment, for example, the third and fourth directions D3 and D4 may be substantially perpendicular to each other when viewed in a plan view, and each of the third and fourth directions D3 and D4 forms an angle of about 45 degrees with the first direction D1 or the second direction D2.

In such an embodiment, a portion of the third branch portions B3 is branched from the second horizontal trunk portion HS2 and the other portion of the third branch portions B3 is branched from the second vertical trunk portion VS2. In such an embodiment, the third branch portions B3 extend substantially in a fifth direction D5 inclined with respect to the first and second directions D1 and D2 and arranged to be spaced apart from each other when viewed in a plan view.

In such an embodiment, a portion of the fourth branch portions B4 is branched from the second horizontal trunk portion HS2 and the other portion of the fourth branch portions B4 is branched from the second vertical trunk portion VS2. In such an embodiment, the fourth branch portions B4 extend substantially in a sixth direction D6 inclined with respect to the first and second directions D1 and D2 and arranged to be spaced apart from each other when viewed in a plan view.

When viewed in a plan view, the sixth direction D6 crosses the fifth direction D5. In one exemplary embodiment, for example, the fifth and sixth directions D5 and D6 may be substantially perpendicular to each other when viewed in a plan view, and each of the fifth and sixth directions D5 and D6 forms an angle of about 45 degrees with the first direction D1 or the second direction D2.

The second sub-pixel electrode SPE2 has a size different from a size of the first sub-pixel electrode SPE1. The size of the second sub-pixel electrode SPE2 may be larger than the size of the first sub-pixel electrode SPE1.

The second sub-pixel electrode SPE2 includes a third horizontal trunk portion HS3, a fourth horizontal trunk portion HS4, a third vertical trunk portion VS3, a fourth vertical trunk portion VS4, and fifth, sixth, seventh and eighth branch portions B5, B6, B7 and B8.

The second sub-pixel electrode SPE2 has a similar shape as a shape of the first sub-pixel electrode SPE1, and thus detailed description of the second sub-pixel electrode SPE2 will be omitted.

In an exemplary embodiment, as shown in FIG. 11, first to fourth domains DM1 to DM4 are defined in the first sub-pixel area SPA1 and fifth to eighth domains DM5 to DM8 are defined in the second sub-pixel area SPA2.

In such an embodiment, where the first to eight domains DM1 to DM8 are defined in the first and second sub-pixel areas SPA1 and SPA2, the first sub-pixel electrode SPE1 may further include a first domain connection portion LP1 and the second sub-pixel electrode SPE2 may further include a second domain connection portion LP2.

The first domain connection portion LP1 is disposed between the second domain DM2 and the third domain DM3 to connect the second and third branch portions B2 and B3, and the second domain connection portion LP2 is disposed between the sixth domain DM6 and the seventh domain DM7 to connect the sixth and seventh branch portions B6 and B7. The first domain connection portion LP1 may be positioned at a center portion of a boundary area between the second and third domains DM2 and DM3, and the second domain connection portion LP2 may be positioned at a center portion of a boundary area between the sixth and seventh domains DM6 and DM7.

When an area in which the liquid crystal molecules are aligned by the first branch portions B1 is referred to as the first domain DM1, a first liquid crystal alignment direction DR1 in the first domain DM1 corresponds to the third direction DR3. When an area in which the liquid crystal molecules are aligned by the second branch portions B2 is referred to as the second domain DM2, a second liquid crystal alignment direction DR2 in the second domain DM2 corresponds to the fourth direction DR4.

When areas in which the liquid crystal molecules are aligned by the third and fourth branch portions B3 and B4 are referred to as third and fourth domains DM3 and DM4, respectively, the third liquid crystal alignment direction DR3 in the third domain DM3 corresponds to the fifth direction D3, and the fourth liquid crystal alignment direction DR4 in the fourth domain DM4 corresponds to the sixth direction D6.

In an exemplary embodiment, as described above, the first to fourth domains DM1 to DM4 sequentially arranged in the second direction D2 are defined in the first sub-pixel area SPA1, and the liquid crystal alignment directions are different from each other in the first to fourth domains DM1 to DM4. Thus, a visible range of the first sub-pixel area SPA1 may be enlarged.

In such an embodiment, fifth to eighth domains DM5 to DM8 sequentially arranged in the second direction D2 are defined in the second sub-pixel area SPA2, and the liquid crystal alignment directions are different from each other in the fifth to eighth domains DM5 to DM8. Thus, a visible range of the second sub-pixel area SPA2 may be enlarged.

In such an embodiment, the first to eighth domains DM1 to DM8 are arranged in the second direction D2 in a single pixel. Accordingly, the domains having different liquid crystal alignment directions may be effectively prevented from overlapping each other even when the misalignment occurs in the curved display device 550 curved in the first direction D1. As a result, the texture defect caused by the misalignment of the liquid crystal molecules may be effectively prevented.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

What is claimed is:

1. A display device comprises a curved first substrate, a curved second substrate, and a light control layer interposed between the curved first substrate and the curved second substrate,
wherein the first substrate comprises:
a first base substrate;
a plurality of signal lines disposed on the first base substrate;
an insulating layer disposed on the plurality of signal lines, the insulating layer comprises a plurality of color filters;
a pixel electrode disposed on the insulating layer; and
a shielding electrode disposed on the insulating layer and electrically insulated from the pixel electrode, the shielding electrode overlaps a boundary portion of two adjacent color filters of the plurality of color filters,
wherein the plurality of signal lines comprise:
a plurality of gate lines extending in a first direction; and
a plurality of data lines extending in a second direction intersecting the first direction,
wherein the second substrate comprises:
a second base substrate;
a common electrode disposed under the second base substrate; and
a black matrix extending only in the first direction, and
wherein the shielding electrode extends in the second direction and overlaps two adjacent data lines of the plurality of data lines,
the pixel electrode is provided as a plurality of pixel electrodes, the shielding electrode is disposed between two horizontally adjacent pixel electrodes, and each of the plurality of pixel electrodes comprises a first sub-pixel electrode and a second sub-pixel electrode, and
the plurality of gate lines includes a gate line disposed between two vertically adjacent pixel electrodes, a main storage line is disposed between the first sub-pixel electrode and the second sub-pixel electrode and extending in the first direction, the black matrix extends along and overlaps both the gate line and the main storage line, and the shielding electrode and the black matrix are overlapped in areas in which the two adjacent data lines cross the gate line and the main storage line.

2. The display device of claim 1, wherein a width of the shielding electrode is greater than a width of each of the plurality of data lines.

3. The display device of claim 1, wherein the plurality of color filters comprise red color filters, green color filters, and blue color filters.

4. The display device of claim 1, wherein the light control layer comprises a liquid crystal layer.

5. The display device of claim 1, wherein the shielding electrode receives a voltage having a same level as a voltage applied to the common electrode.

6. The display device of claim 1, wherein the black matrix is interposed between the second base substrate and the common electrode.

7. The display device of claim 1, wherein the curved first substrate is curved to have a first radius of curvature and the curved second substrate is curved to have a second radius of curvature greater than the first radius of curvature.

* * * * *